(12) United States Patent
Yeik

(10) Patent No.: US 9,718,506 B1
(45) Date of Patent: Aug. 1, 2017

(54) VEHICLE PROPULSION SYSTEM USING WIND

(71) Applicant: Jerry Alan Yeik, Antioch, TN (US)

(72) Inventor: Jerry Alan Yeik, Antioch, TN (US)

( * ) Notice: Subject to any disclaimer, the term of this patent is extended or adjusted under 35 U.S.C. 154(b) by 0 days.

(21) Appl. No.: 15/000,421

(22) Filed: Jan. 19, 2016

Related U.S. Application Data

(60) Provisional application No. 62/104,814, filed on Jan. 18, 2015.

(51) Int. Cl.
*B62D 57/04* (2006.01)
*B62D 35/00* (2006.01)
*B60K 8/00* (2006.01)

(52) U.S. Cl.
CPC ............. *B62D 57/04* (2013.01); *B60K 8/00* (2013.01); *B62D 35/001* (2013.01)

(58) Field of Classification Search
CPC ......... B62D 57/04; B62D 35/001; B60K 8/00
USPC .......................................................... 180/7.1
See application file for complete search history.

(56) References Cited

U.S. PATENT DOCUMENTS

| | | | | |
|---|---|---|---|---|
| 3,276,811 A * | 10/1966 | Schmidt | ............... | B62D 35/007 296/91 |
| 4,838,603 A * | 6/1989 | Masoero | ............... | B60Q 1/0005 296/180.1 |
| 5,171,057 A * | 12/1992 | Sharp | .................. | B62D 35/001 296/180.4 |
| 5,542,737 A * | 8/1996 | Madden | ............... | B62D 35/007 180/903 |
| 5,680,032 A | 10/1997 | Pena | | |
| 6,561,575 B2 * | 5/2003 | Fairburn | ............. | B62D 35/001 180/165 |
| 6,692,066 B2 * | 2/2004 | Fairburn | ............. | B62D 35/001 180/165 |
| 6,779,834 B1 * | 8/2004 | Keller | ................. | B62D 35/001 296/180.4 |
| 6,838,782 B2 | 1/2005 | Vu | | |
| 7,152,908 B2 * | 12/2006 | Shahbazi | ............... | B62D 35/00 296/180.1 |
| 7,185,944 B2 * | 3/2007 | Shahbazi | ............... | B62D 35/00 296/180.1 |
| 7,216,923 B2 * | 5/2007 | Wong | ................... | B62D 35/001 180/309 |
| 7,712,821 B2 * | 5/2010 | Moscoso Gomez | . | B62D 35/001 296/180.1 |
| 8,196,996 B1 * | 6/2012 | Campbell | ........... | B62D 35/001 296/180.1 |
| 8,618,683 B2 | 12/2013 | Diaz | | |
| 2012/0056428 A1 | 3/2012 | Bennett | | |
| 2015/0225025 A1 * | 8/2015 | Habershon | .......... | B62D 35/001 296/180.1 |

FOREIGN PATENT DOCUMENTS

WO    2013041907    3/2013

* cited by examiner

*Primary Examiner* — Kevin Hurley
*Assistant Examiner* — Michael Stabley
(74) *Attorney, Agent, or Firm* — Shane V. Cortesi

(57) ABSTRACT

A capturing wind power system is described that includes a plurality of pipes that extend along the vehicle length and curve towards the rear end of the vehicle. The pipes capture air to help propel the vehicle forward, improving fuel mileage. A cover may be used encase the pipes and allow a rear segment of the pipes to be removed when opening a door at the rear end of the vehicle.

7 Claims, 4 Drawing Sheets

VEHICLE PROPULSION SYSTEM USING WIND

RELATED APPLICATIONS

This application claims priority under 35 U.S.C. §119 to U.S. Provisional Patent Application No. 62/104,814, filed Jan. 18, 2015, entitled "Jay Systems", the contents of which are incorporated herein by reference in their entirety.

BACKGROUND

Technical Field

The inventive device disclosed in the present application generally relates to wind energy capture devices and more specifically to a capturing wind power system, created as a vehicle moves forward, to help propel the vehicle forward, improving fuel mileage.

Background of the Invention

Vehicle wind energy capture devices are well known in the art. For example, U.S. Pat. No. 5,680,032 to Pena discloses and claims an electrically-powered vehicle, air is captured at the front of the vehicle and channeled to one or more turbines. The air from the turbines is discharged at low pressure regions on the sides and/or rear of the vehicle. Pena teaches that the motive power of the air rotates the turbines, which are rotatably engaged with a generator to produce electrical energy that is used to recharge batteries that power the vehicle. The Pena generator is rotatably engaged with a flywheel for storing mechanical energy while the vehicle is in forward motion. When the vehicle slows or stops, the flywheel releases its stored energy to the generators, thereby enabling the generator to continue recharging the batteries. The flywheel enables the generators to provide a more stable and continuous current flow for recharging the batteries.

In addition to that, U.S. Pat. No. 6,838,782 to Vu discloses and claims a wind energy capturing device for moving vehicles including a wind turbine powered electrical power generator for installation on the roof of a moving vehicle such as a truck cab or tractor. The invention described in the Vu patent takes advantage of the powerful wind force generated by the vehicle moving on the road at moderate to high speed impinging against the wind deflector mounted on the truck cab or tractor. This otherwise "wasted" wind energy is captured and directed to the face area of the rotor blade, rotating the turbine, which, in turn, drives the generator to generate electricity. The electrical energy may be stored in a battery system and used to drive the motors of an electric vehicle or hybrid-electric vehicle.

U.S. Pat. No. 8,618,683 to Diaz also discloses and claims a system for an electrical generator system for a vehicle. The system disclosed by Diaz' patent includes a wind turbine, an electrical generator mechanically connected to the wind turbine and configured to connect to an electrical energy storage device that is configured to store electrical energy on-board the vehicle, and a rigid, conical housing, forming an interior chamber, the housing having an inlet end and an outlet end, the inlet end having a larger diameter than the outlet end, and the conical housing configured to direct wind flow into the wind turbine.

U.S. Published Patent Application No. 20120056428 to Bennet et al. discloses systems and methods of capturing and channeling air through a wind turbine mounted atop a truck (or vehicle roof). Under the teachings of the Bennet et al. published patent application the air can be channeled through a specially designed truck roof into an inlet of a wind turbine. In other aspects, ductwork can be used to channel and direct air captured while the truck is in motion. The wind turbine can be a traditional propeller-based turbine. In other aspects, air foil technologies can be employed to increase air flow to and through a turbine.

Finally, International Patent Application No. WO2013041907 discloses, an invention that would allow continuous charging of the vehicle battery through solar panels and wind turbines, allowing for maximum conservation of energy and extended range of purely electric vehicles, greatly reducing or even eliminating the need to plug them in and strain our electricity grid. Vehicles can charge up in the parking lot during the day and conserve energy while driving using the wind turbines and solar panels. As described in the International Patent Application, the system utilizes a roof mounted apparatus with a solar panel and wind turbines to assist with recharging the batteries. This roof design was chosen for simplicity and ease of maintenance. Solar panels can be placed on the hood and truck for more area coverage and additional wind turbines can be added to lower bumper air intakes or hood intakes to improve charging.

Despite all the efforts listed above prior art patents describe structures that are either not truly convenient or else involve complicated, expensive, and overly difficult assembly and/or disassembly parts and procedures.

BRIEF SUMMARY

The invention is a capturing wind power system, created as a vehicle moves forward, to help propel the vehicle forward, improving fuel mileage. The air will be captured by a panel of pipes installed along the side of the vehicle that curve around the end so the forced air will propel the vehicle forward.

A principal object of the present invention is to provide a system that saves money for the companies and operators of vehicles using this system by reducing fuel costs. It is a secondary objective of the present invention to provide a system that will reduce air pollution caused by vehicles.

It is an additional objective of the present invention to provide a device that does not rust or deteriorate over time and that can be safely installed on a truck. A final objective of the present invention is to provide for a device that is relatively inexpensive to build and set up, but can eventually be sold at a premium.

These and other objective achieved by the device of the present invention will be apparent by the drawings, by their detailed description, and by the specification here from appended.

In some embodiments, the vehicle propulsion system comprises: a) a motorized vehicle comprising an interior configured to hold cargo, an exterior, a front end, a rear end, a motorized vehicle length extending from the front end to the rear end, a left side, a right side, a motorized vehicle length extending from the left side to the right side and an engine configured to move the motorized vehicle in a forward direction; b) a plurality of pipes located on the motorized vehicle exterior and extending along the motorized vehicle length and curving towards the rear end of the motorized vehicle, each of the plurality of pipes having a front end comprising an inlet port facing the forward direction, a rear end comprising an outlet port facing the rear end of the motorized vehicle, a length extending from the pipe front end to the pipe rear end and a width perpendicular to the pipe length, wherein each inlet port is configured to capture air when the motorized vehicle moves in the forward direction, and wherein each outlet port faces the rear end of the motorized vehicle and is configured to force the air captured by the inlet port toward the rear end of the motorized vehicle in order to assist in the propulsion of the motorized vehicle.

Optionally, the pipe length is generally parallel to the motorized vehicle length as each pipe extends along the motorized vehicle length. Optionally, each pipe comprises a straight segment comprising the inlet port and a curved segment attached to the straight segment and comprising the outlet port. Optionally, the straight segment of at least some of the plurality of pipes comprises a forward straight segment having a forward straight segment width and a rear straight segment rearwardly disposed to the forward straight segment and having a rear straight segment width, the rear straight segment width less than the forward straight segment width. Optionally, the system further comprises a cover encasing the plurality of pipes, the cover attached to the motorized vehicle exterior. Optionally, the cover comprises a forward section comprising the inlet ports of the plurality of pipes and a removable rear section comprising the outlet ports of the plurality of pipes and further wherein the rear section of the cover is removably attached to the forward section of the cover by a fastener. Optionally, each pipe extends substantially the entire length of the motorized vehicle. Optionally, the motorized vehicle is a truck comprising a plurality of wheels and a cab.

BRIEF DESCRIPTION OF THE DRAWINGS

in FIG. 3, the cover has been made transparent to show the plurality of pipes.

DETAILED DESCRIPTION

Figure 1:
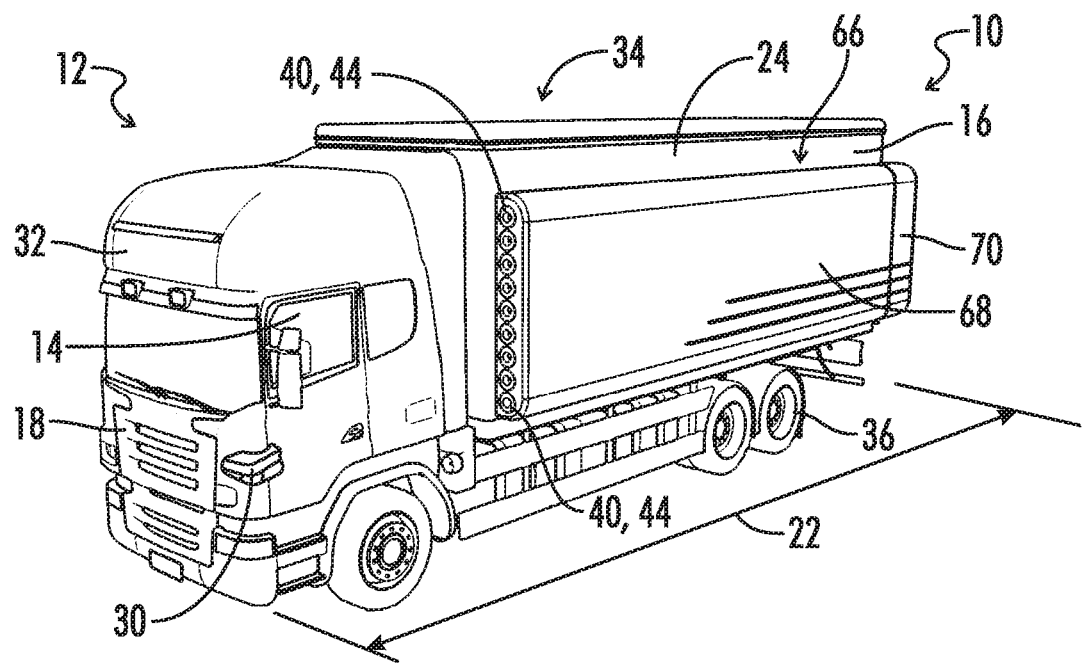
FIG. 1 illustrates a front, perspective view of a vehicle propulsion system of one embodiment of the present invention in which the pipes extend along the vehicle length.

The invention is a capturing wind power system, created as a vehicle moves forward, to help propel the vehicle forward, improving fuel mileage. The air will be captured by a panel of pipes installed along the side of the vehicle that curve around the end so the forced air will propel the vehicle forward. As it can be inferred from the drawings essential components of the "Jay System" of the present application include: an inlet port, a case cover, pipes, an outlet port, and a truck.

The Jay System can be modified and installed on any kind of vehicle to enhance its fuel efficiency as it moves forward. A panel of pipes is attached to one or both sides, open on the front end, for capturing the air as the vehicle moves forward. The air is forced towards the back of the vehicle as more enters through input holes on the front. The pipes curve around the end, and the force of this captured air will assist to propel the vehicle forward.

This system can be adapted to any forward moving vehicle, and the fuel efficiency of large vehicles, like trucks, trains, and boats, will be greatly enhanced. The attached panel of pipes would be encased in a protective covering. A piece of the covering, the part that curves around the back end, can be removed and replaced easily to facilitate the opening of the barn-type doors on trucks. The clasps that hold the curved pieces would have to be accessible so they can be unlatched by someone standing on the ground. One way may be to install a rod that slides down through 3 holes and latches at the bottom, sitting in a hole so it will not slip out, and the clasps would be released when the rod is pushed upward.

More particularly, referring to FIGS. 1-6 the present disclosure provides a vehicle propulsion system generally designated by the numeral 10. In the drawings, not all reference numbers are included in each drawing for the sake of clarity.

Referring further FIGS. 1-6, the vehicle propulsion system 10 comprises a motorized vehicle 12 comprising an interior 14 configured to hold cargo, an exterior 16, a front end 18, a rear end 20, a motorized vehicle length 22 extending from the front end 18 to the rear end 20, a left side 24, a right side 26, a motorized vehicle width 28 extending from the left side 24 to the right side 26 and an engine 30 configured to move the motorized vehicle 12 in a forward direction. The motorized vehicle 12 may be any suitable motorized vehicle as described above, including but not limited to land and marine vehicles. In some embodiments, the motorized vehicle 12 is a truck comprising a cab 32, a trailer 34 and a plurality of wheels 36.

Figure 2:
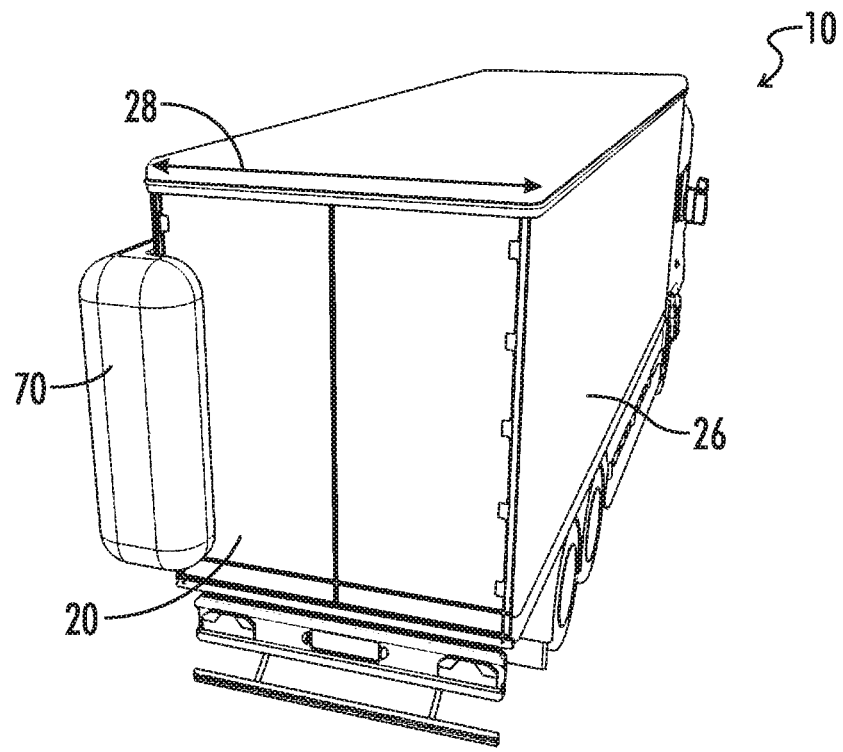
FIG. 2 illustrates a rear, perspective view of the vehicle propulsion system of FIG. 1.
Figure 3:
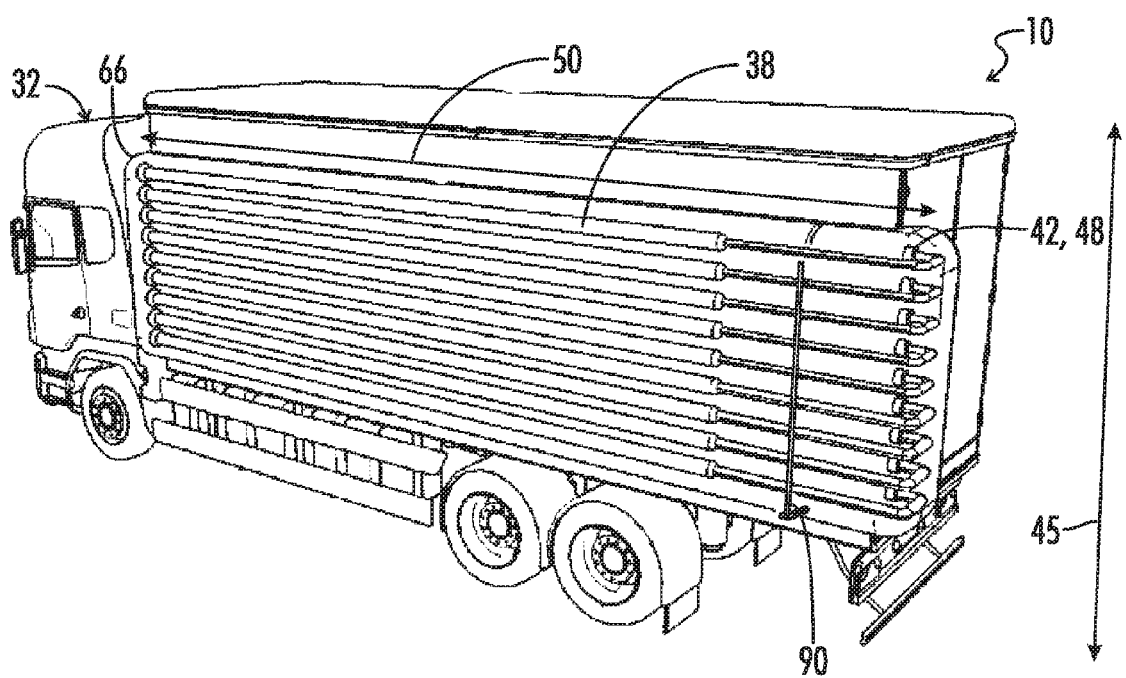
FIG. 3 illustrates a left side, perspective view of the vehicle propulsion system of FIG. 1.
Figure 4:
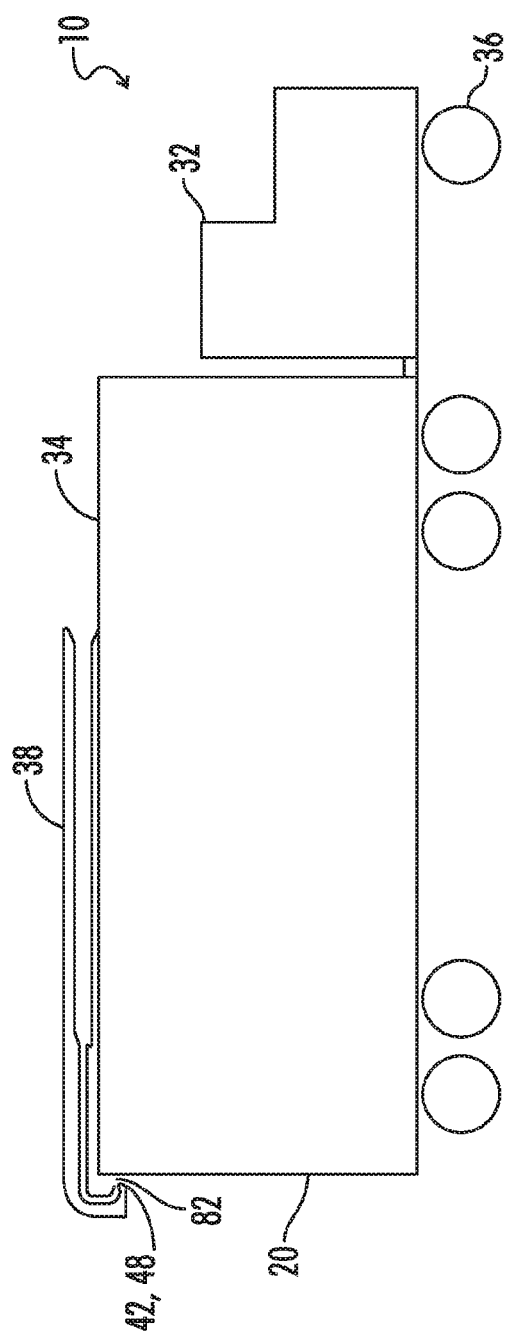
FIG. 4 illustrates a side elevation view of a vehicle propulsion system of another embodiment of the present invention in which the pipes extend along the vehicle length.
Figure 5:
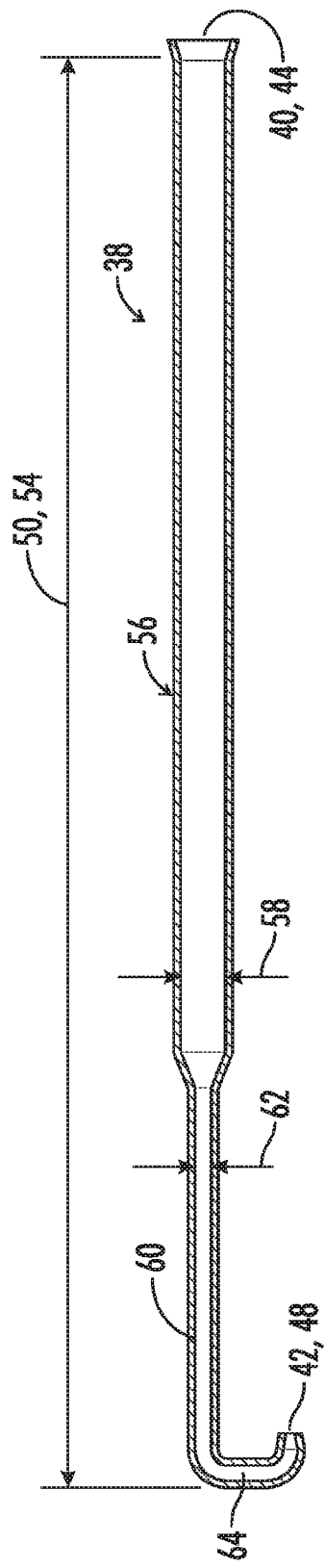
FIG. 5 illustrates a side sectional view of a pipe that may be used in the vehicle propulsion system of the present invention; as shown the pipe diameter includes a forward straight segment that has a wider diameter than a rear straight segment; in addition, the inlet port is flared like a funnel and the outlet port is a reverse flare/funnel.

The vehicle propulsion system 10 further comprises a plurality of pipes 38 located on the motorized vehicle exterior 16 and extending along the motorized vehicle length 22 and curving towards the rear end 20 of the motorized vehicle 12, each of the plurality of pipes 38 having a front end 40 comprising an inlet port 42 facing the forward direction, a rear end 44 comprising an outlet port 48 facing the rear end 20 of the motorized vehicle 12, a pipe length 50 extending from the pipe front end 40 to the pipe rear end 44 and a width/diameter perpendicular to the pipe length 50. When it is said that the pipes 38 are located on the motorized vehicle exterior 16, the pipes 38 may be directly attached to, and flush with, the motorized vehicle exterior 16 or may indirectly attached to the motorized vehicle exterior 16 using a cover 66 as explained below. (As explained below, if present the cover 66 does not need to be between the pipes 38 and the motorized vehicle exterior 16—i.e., even with a cover, the pipes 38 may be directly attached to, and flush with, the motorized vehicle exterior 16). The pipe length 50 may be generally parallel to the motorized vehicle length 22 as each pipe 38 extends along the motorized vehicle length 22. In other words, the pipes 38 may be arranged in a plurality of rows along the height 45 of the vehicle 12 and the pipes 38 are parallel to the surface on which the motorized vehicle moves 12 (e.g., the roadway), as best seen in FIG. 3. The pipes 38 may extend substantially the entire vehicle length 22. In some embodiments, the pipes 38 may be located on the left and/or right sides 24 and 26 of the vehicle 12, as shown in FIGS. 1-3, or on top of the vehicle 12, as shown in FIG. 4. Each inlet port 44 is configured to capture air when the motorized vehicle 12 moves in the forward direction. Each outlet port 48 faces the rear end 20 of the motorized vehicle 10 and is configured to force the air captured by the inlet port 44 toward the rear end 20 of the motorized vehicle 10 in order to assist in the propulsion of the motorized vehicle 10. There may be further be a gap 82 between the outlet port 48 and the motorized vehicle rear end 20, as shown in FIG. 4. Optionally, each pipe 38 comprises a straight segment 54 comprising the inlet port 44 and a curved segment 64 attached to the straight segment 54 and comprising the outlet port 48. Optionally, the width/diameter of the pipes 38 decreases from the forward end 40 to the rear end 42, as best seen in FIGS. 3 and 5. For example, the width/diameter of the inlet port 44 may be flared like a funnel and the outlet port 48 may have a reverse flare/funnel. In addition, the straight segment 54 of at least some of the plurality of pipes 38 may comprise a forward straight segment 56 having a forward straight segment width/diameter 58 and a rear straight segment 60 rearwardly disposed to the forward straight segment 58 and having a rear straight segment width/diameter 62, the rear straight segment width/diameter 62 less than the forward straight segment width/diameter 58, as best seen in FIGS. 3 and 5. The reason for the varied width is that narrowing the pipe width/diameter increases the velocity of the air traveling through the pipe 38 because of the Bernoulli principle.

Optionally, the plurality of pipes 38 are generally straight, as the curved segment 64 is generally shorter than the straight segment 54.

Figure 6:
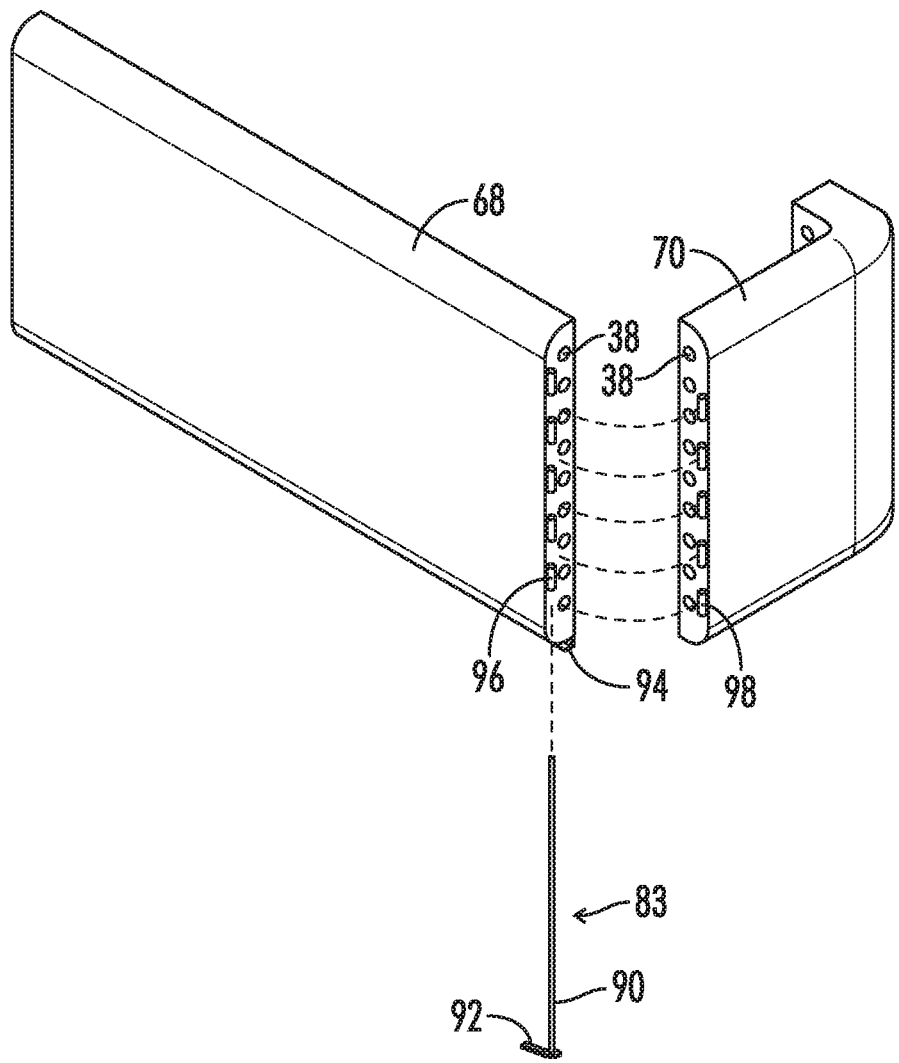
FIG. 6 illustrates a side, perspective view of a cover in which the front section removably attaches to the rear section.

Optionally, the system 10 further comprises a cover 66 encasing the plurality of pipes 38, the cover 66 attached to the motorized vehicle exterior 16. (It will be understood that the cover 66 does not prevent air from entering the inlet port 44, as best seen in FIG. 1 where the inlet ports 44 are not covered by the cover 66). Optionally, the cover 66 comprises a forward section 68 comprising the inlet ports 44 of the plurality of pipes 38 and a removable rear section 70 comprising the outlet ports 48 of the plurality of pipes 38 and further wherein the rear section 70 of the cover 66 is removably attached to the forward section 68 of the cover by a fastener 83. FIG. 6 illustrates one example of a T-shaped fastener 83 that includes a vertical segment 90 and a horizontal segment 92. The vertical segment 90 passes through loops 96 in the cover front section 68 and loops 98 in the cover rear section 70. The horizontal segment 92 nests into a lock 94 in the cover front section 68 when the cover front section 68 is attached to the cover rear section 70 are attached. To remove the cover rear section 70, the user disengages the lock 94 and rotates the fastener 83. The fastener 83 is then removed from the loops 96 and 98, detaching the cover rear section 70.

The detachment mechanism allows the system 10 to be used in a truck 12 where the rear doors swing open like a barn door. Alternatively, instead of a detachment mechanism, the curved segment 64 of the pipes 38 may pivot/swivel relative to the straight segment 54. It will be appreciated that a detachment mechanism and pivot/swivel mechanism may not be needed with trucks 12 having a rear door that slides open vertically, depending on the needs of the user. With trucks 12 having a rear door that slides open vertically, the outlet port 48 may face the border surrounding the rear door (as opposed to the rear door itself) so as to not interfere with removing articles from the trailer 34.

The cover 66 may be for example a hard plastic or aluminum housing and is preferably light weight. If the cover 66 is included, the pipes 38 may be directly attached to the vehicle exterior 16 and the cover 66 may also be directly attached to the vehicle exterior 16 and surround the pipes 38, allowing the pipes 38 to be directly attached to, and flush with, the motorized vehicle exterior 16.

It will be appreciated that the vehicle propulsion system 10 is able to propel the vehicle 12 without any system that converts the wind into electricity (e.g., without turbines) or that otherwise powers the vehicle battery or engine 30. Thus, as shown in FIGS. 1-6, preferably the pipes 38 are not in communication with a turbine.

A vehicle propulsion system 10 similar to that shown in FIGS. 1-3 was assembled on a moving truck 12, except that the pipes 38 were located on both the left and right sides 24 and 26 of the moving truck 12, and a cover 66 was not used. Each of the left and the right sides 24 and 26 of the moving truck 12 included nine pipes 38 that were 14.5 feet in length 50 and extended along the vehicle length 22 parallel to the roadway. Each of the pipes 38 had an inlet port 44 that was 4 inches in diameter. The inlet ports 44 of all pipes 38 was connected to a forward straight segment 56 having a diameter 58 of 1.5 inches. The forward straight segment 56 of five of the pipes 38 on each of the left and right sides 24 and 26 was connected to a rear straight segment 60 having a diameter 62 of 0.75 inches. The rear straight segment 60 of these five pipes 38 was then connected to a curved segment 64. The four other pipes 38 on each of the left and right sides 24 and 26 had the curved segment 64 connected directly to the forward straight segment 56. (In other words, for these four pipes 38, the straight segment 54 diameter was not variable). The curved segment 64 of all pipes 38 was then connected to an outlet port 48 having a diameter of 0.5 inches. The pipes 38 were attached to the left and right sides 24 and 26 by brackets. The operator of the moving truck 12 experienced ten miles per gallon without the pipes 38 and 12.2 miles per gallon with the pipes 38 in highway driving. It was observed that city driving with the pipes 38 increased fuel efficiency relative to city driving without the pipes 38 but less improvement was experienced. Thus, it was concluded that the pipes 38 increased the gas mileage of the moving truck 12. It will be appreciated that the pipe dimensions and arrangement provided above is merely illustrative of use of the present invention, and that other dimensions and arrangements may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:
1. A vehicle propulsion system comprising:
 a) a motorized vehicle comprising an interior configured to hold cargo, an exterior, a front end, a rear end, a motorized vehicle length extending from the front end to the rear end, a left side, a right side, a motorized vehicle length extending from the left side to the right side and an engine configured to move the motorized vehicle in a forward direction;
b) a plurality of pipes located on the motorized vehicle exterior and extending along the motorized vehicle length and curving towards the rear end of the motorized vehicle, each of the plurality of pipes having a front end comprising an inlet port facing the forward direction, a rear end comprising an outlet port facing the rear end of the motorized vehicle, a length extending from the pipe front end to the pipe rear end and a width perpendicular to the pipe length; and
c) a cover encasing the plurality of pipes, the cover attached to the motorized vehicle exterior,
wherein each inlet port is configured to capture air when the motorized vehicle moves in the forward direction, and
wherein each outlet port faces the rear end of the motorized vehicle and is configured to force the air captured by the inlet port toward the rear end of the motorized vehicle in order to assist in the propulsion of the motorized vehicle.

2. The vehicle propulsion system of claim 1 wherein the pipe length is generally parallel to the motorized vehicle length as each pipe extends along the motorized vehicle length.

3. The vehicle propulsion system of claim 1, wherein each pipe comprises a straight segment comprising the inlet port and a curved segment attached to the straight segment and comprising the outlet port.

4. The vehicle propulsion system of claim 3 wherein the straight segment of at least some of the plurality of pipes comprises a forward straight segment having a forward straight segment width and a rear straight segment rearwardly disposed to the forward straight segment and having a rear straight segment width, the rear straight segment width less than the forward straight segment width.

5. The vehicle propulsion system of claim 1 wherein the cover comprises a forward section comprising the inlet ports of the plurality of pipes and a removable rear section comprising the outlet ports of the plurality of pipes and further wherein the rear section of the cover is removably attached to the forward section of the cover by a fastener.

6. The vehicle propulsion system of claim 1, wherein each pipe extends substantially the entire length of the motorized vehicle.

7. The vehicle propulsion system of claim 1, wherein the motorized vehicle is a truck comprising a plurality of wheels and a cab.

* * * * *